(12) United States Patent
Morioka

(10) Patent No.: US 6,942,398 B2
(45) Date of Patent: Sep. 13, 2005

(54) OPTICAL MODULE AND OPTICAL CONNECTOR HAVING SAME

(75) Inventor: Shimpei Morioka, Kanagawa (JP)

(73) Assignee: Enplas Corporation, Saitama (JP)

( * ) Notice: Subject to any disclaimer, the term of this patent is extended or adjusted under 35 U.S.C. 154(b) by 21 days.

(21) Appl. No.: 10/803,388

(22) Filed: Mar. 16, 2004

(65) Prior Publication Data

US 2004/0190837 A1 Sep. 30, 2004

(30) Foreign Application Priority Data

Mar. 26, 2003 (JP) .................................... P2003-084965

(51) Int. Cl.$^7$ ................................................ G02B 6/36
(52) U.S. Cl. ............................. 385/93; 385/33; 385/34; 385/35; 385/37; 385/61; 385/79; 385/88; 385/89; 385/92; 385/140; 264/1.1; 264/1.24; 264/1.25; 264/1.26; 264/1.31; 264/1.32
(58) Field of Search ............................. 385/33–35, 37, 385/61, 79, 88, 89, 92, 93, 140; 264/1.1, 1.24

(56) References Cited

U.S. PATENT DOCUMENTS 5,687,270 A * 11/1997 Takizawa ...................... 385/94
6,792,181 B2 * 9/2004 Sasaki .......................... 385/37

FOREIGN PATENT DOCUMENTS

JP 10-300994 11/1998
JP 2002-43675 2/2002

* cited by examiner

Primary Examiner—Brian Healy
Assistant Examiner—Jerry Martin Blevins
(74) Attorney, Agent, or Firm—Backman & LaPointe, P.C.

(57) ABSTRACT

There is provided an optical module capable of improving assembling efficiency and reducing the number of parts to reduce production costs, and an optical connector having the same. The optical module has a holder 3, a lens 12 and a diffraction grating 13 for damping the quantity of light. The holder 3, the lens 12 and the diffraction grating 13 are formed of a resin material so as to be integrated with each other. The diffracting grating 13 is designed to prevent high-order diffracted light beams from being coupled with an optical fiber 8.

6 Claims, 2 Drawing Sheets

OPTICAL MODULE AND OPTICAL CONNECTOR HAVING SAME

BACKGROUND OF THE INVENTION

1. Field of the Invention

The present invention generally relates to an optical module and an optical connector having the same. More specifically, the invention relates to an optical module for high-speed and large-capacity optical communication using an optical fiber, and an optical connector having the same.

2. Description of the Background Art

In recent years, the request for optical fiber communication technology using optical fibers increases as the speed and capacity for data communication increase. A typical optical module for such optical fiber communication comprises: a photoelectric transfer element package (e.g., a package housing therein a semiconductor light emitting element, such as a semiconductor laser, or a semiconductor light receiving element, such as a photodiode); a ferrule for holding an end face of an optical fiber; a lens; and a holder for housing therein them.

In such an optical module, a photoelectric transfer element in the photoelectric transfer element package is optically coupled with the optical fiber, which is held by the ferrule, via the lens to enable optical communication.

As examples of such optical modules, there are optical modules disclosed in Japanese Patent Laid-Open Nos. 10-300994 and 2002-43675. In these optical modules, a photoelectric transfer element package, a ferrule and a lens are separated, so that an aligning operation for aligning the optical axes of the respective parts with each other must be carried out when the parts are housed in a holder. Therefore, in these optical modules, working and assembling efficiencies are not good.

Therefore, the inventor has diligently studied and proposed an optical module wherein a lens and a holder are formed of a plastic so as to be integrated with each other (Japanese Patent Application No. 2003-026656). In such an optical module, since it is not required to align the optical axis of the lens with the axis of the holder, it is possible to facilitate the assembly of the optical module, so that it is possible to improve the production efficiency of the optical module.

Recently, as a new form of an optical module, there is a tendency to provide an optical module having a light-quantity damping filter for damping the quantity of light traveling between a photoelectric transfer element package and an optical fiber.

For example, such a light-quantity damping filter is arranged between a photoelectric transfer element package and a lens in a holder, in order to prevent excessively strong light from being incident on a semiconductor light receiving element to cause communication errors while causing light to be emitted from a region in which voltage/current characteristics are stable on the side of a semiconductor light emitting element.

However, since the light-quantity damping filter is separated from the holder and lens in the conventional optical module with the light-quantity damping filter, assembling efficiency is not good, and the number of parts is large.

Thus, there is a problem in that an optical module having a light-quantity damping filter can not be inexpensively produced, and effective means for solving this problem have not yet been proposed.

SUMMARY OF THE INVENTION

It is therefore an object of the present invention to eliminate the aforementioned problems and to provide an optical module having excellent optical characteristics, the optical module being capable of improving assembling efficiency and reducing the number of parts to reduce production costs, and an optical connector having the same.

In order to accomplish the aforementioned and other objects, according to one aspect of the present invention, an optical module comprises: a holder having a photoelectric transfer element package mounting hole for mounting therein a photoelectric transfer element package which houses therein a photoelectric transfer element, and an optical fiber mounting hole for mounting therein an optical fiber and a ferrule, the photoelectric transfer element package mounting hole being arranged on one side of the holder in axial directions thereof, and the optical fiber mounting hole being arranged on the other side of the holder in axial directions thereof; a lens, arranged between the photoelectric transfer element package mounting hole and the optical fiber mounting hole in the holder, for causing the photoelectric transfer element to be optically coupled with the optical fiber; and light-quantity damping means for damping the quantity of light, which is emitted from the photoelectric transfer element, before the light enters the optical fiber, wherein the holder, the lens and the light-quantity damping means are formed of a resin material so as to be integrated with each other.

In this optical module, the light-quantity damping means preferably comprises a diffraction grating for preventing a high-order diffracted light beam from being coupled with the optical fiber. The diffraction grating preferably satisfies the following conditional expression (1) so as to cause only a zeroth-order diffracted beam to be coupled with the optical fiber:

$$P<\lambda/[\sin[\tan^{-1}\{\tan\theta_{NA}+\Phi/L\}]-\sin\theta_{NA}] \quad (1)$$

wherein P denotes a spacing of the diffraction grating, and λ denotes a wavelength to be used, Φ denoting a diameter of the optical fiber, L denoting a distance between an end face of the optical fiber and the diffraction grating, and $\theta_{NA}$ denoting an angle (NA=sin $\theta_{NA}$) for giving a numerical aperture (NA) of the optical fiber.

According to the above described optical module, the light-quantity damping means, the lens and the holder are formed so as to be integrated with each other, so that it is possible to improve assembling efficiency and reduce the number of parts. If the diffraction grating for preventing the high-order diffracted light beam from being coupled with the optical fiber is used as the light-quantity damping means, it is possible to simply and effectively prevent the occurrence of communication errors. In addition, if light reflected on the diffraction grating toward the photoelectric transfer element is treated as monitoring light for determining whether light is appropriately incident on the optical fiber, it is possible to more appropriately carry out optical communication. If the diffraction grating satisfies the above described expression (1), such an optical module capable of appropriately carrying out optical communication can be uniformly designed under conditions unified by expression (1), so that it is possible to more highly improve productivity.

According to another aspect of the present invention, an optical connector comprises: the above described optical module; and a housing for receiving and holding therein the optical module.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiment of an optical module and an optical connector having the same according to the present invention will be described below in detail.

Figure 1:
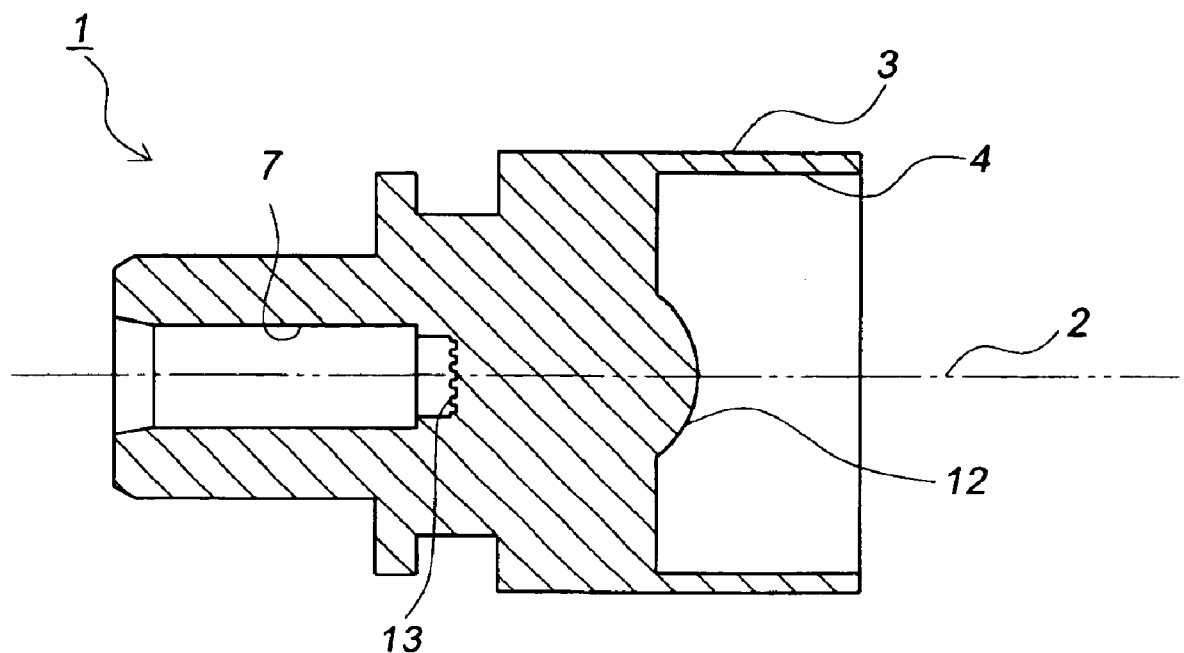
FIG. 1 is a longitudinal section schematically showing a holder in a preferred embodiment of an optical module according to the present invention.

As shown in FIG. 1, the preferred embodiment of an optical module 1 according to the present invention has a holder 3 extending along an optical axis 2. The holder 3 is formed by injection-molding a resin material, such as a phototransparent plastic (e.g., PEI (polyether imide), PC (polycarbonate) PMMA (polymethylmethacrylate)).

Figure 2:
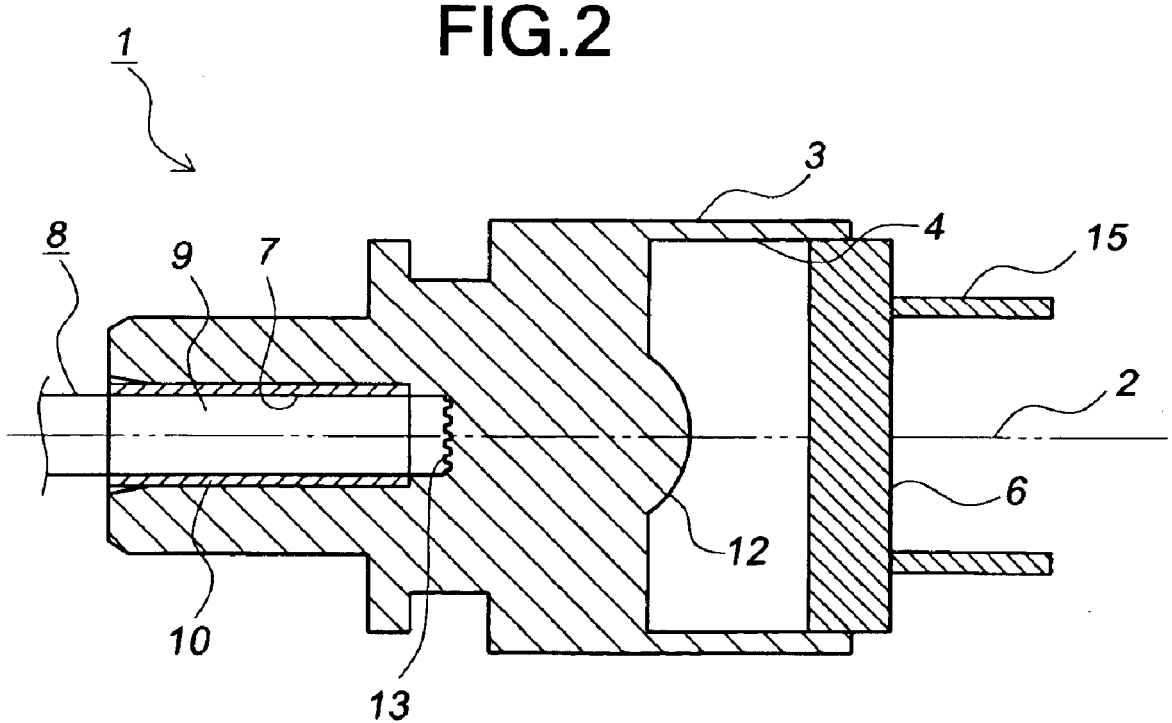
FIG. 2 is alongitudinal section of a preferred embodiment of an optical module according to the present invention, which schematically shows a state that a photoelectric transfer element package and an optical fiber are mounted on a holder.

One end (the right side in FIG. 1) of the holder 3 in directions parallel to the optical axis 2 has a photoelectric transfer element package mounting hole 4 which extends along the optical axis 2. As shown in FIG. 2, a photoelectric transfer element package 6 housing therein a semiconductor light emitting element, such as a semiconductor laser, as an example of a photoelectric transfer element is designed to be mounted in the photoelectric transfer element package mounting hole 4.

On the other hand, the other end (the left side in FIG. 1) of the holder 3 in directions parallel to the optical axis 2 has an optical fiber mounting hole 7 which extends along the optical axis 2. As shown in FIG. 2, an optical fiber 8, together with a ferrule 10 for holding the end face of a fiber core 9 of the optical fiber 8, is designed to detachably mounted in the optical fiber mounting hole 7.

Between the photoelectric transfer element package mounting hole 4 and the optical fiber mounting hole 7 in the holder 3, a lens 12 having a convex surface on the side of the photoelectric transfer element package 6 is arranged. The lens 12 is formed so as to be integrated with the holder 3.

In this preferred embodiment, on a surface of the holder 3 facing the optical fiber 8 and being opposite to the lens 12, a diffraction grating 13 serving as a light-quantity damping means for damping the quantity of light, which is emitted from a semiconductor light emitting element, before the light is incident on the optical fiber 8, is formed so as to be integrated with the holder 3.

The diffraction grating 13 is designed to utilize diffraction of light to disperse light, which is emitted from the semiconductor light emitting element to be condensed by the lens 12, into diffracted light beams of a plurality of diffraction orders to prevent high-order diffracted light beams of the dispersed light from being coupled with the optical fiber 8.

Therefore, the diffraction grating 13 can prevent excessively strong light from being incident on the optical fiber 8 from the semiconductor light emitting element, so that it is possible to effectively prevent the occurrence of communication errors. Since the diffraction grating 13 is formed so as to be integrated with the holder 3, it is possible to reduce the number of parts, and it is possible to omit a step of mounting the diffraction grating 13 into the holder 3, so that it is possible to improve the assembling efficiency of the optical module 1.

Furthermore, if light reflected on the diffraction grating 13 toward the semiconductor light emitting element is treated as monitoring light for determining whether light is appropriately incident on the optical fiber 8, it is possible to more appropriately carry out optical communication.

More preferably, the diffraction grating 13 is designed to cause only the zeroth-order diffracted light beam to be coupled with the end face of the optical fiber 8. In order to achieve this, conditions expressed by the following expression (1) must be satisfied:

$$P < \lambda / [\sin[\tan^{-1}\{\tan \theta_{NA} + \Phi/L\}] - \sin \theta_{NA}] \qquad (1)$$

wherein P denotes the spacing of the diffraction grating 13, and λ denotes a wavelength to be used, Φ denoting the diameter (core diameter) of the optical fiber 8, L denoting the distance between the end face of the optical fiber 8 and the diffraction surface 16 of the diffraction grating 13, and $\theta_{NA}$ denoting an angle (NA=sin $\theta_{NA}$) for giving the numerical aperture (NA) of the optical fiber 8.

The expression (1) expresses conditions that only the zeroth-order diffracted light beam is coupled with the optical fiber 8, i.e., that the diffracted light beams of the first and higher orders are not coupled with the optical fiber 8. The expression (1) is derived from the following process.

First, conditions that a light beam diffracted by the diffraction grating 13 is coupled with the optical fiber 8 are expressed by the following expression using the incident angle $\theta_{in}$ of the diffracted light beam on the end face of the optical fiber 8 and the numerical aperture NA of the optical fiber 8.

$$\sin \theta_{in} \leq NA \qquad (2)$$

Assuming that an angle for giving NA is $\theta_{NA}$ (NA=sin $\theta_{NA}$), $0 \leq \theta_{in} \leq \pi/2$ and $0 \leq \theta_{NA} \leq \pi/2$, so that the following expression may be substituted for expression (2).

$$\theta_{in} \leq \theta_{NA} \qquad (3)$$

Since the diffraction angle $\theta_m$ (m: order) of the diffracted light beam increases as the order increases, the diffraction angle $\theta_m$ is expressed by $\theta_1 < \theta_m$ ($2 \leq m$). Thus, the incident angle on the end face of the optical fiber 8 also increases as the order increases.

Therefore, in order to obtain the conditions that only the zeroth-order diffracted light beam is coupled with the optical fiber 8, it is sufficient just to obtain conditions that the first-order diffracted light beam is not coupled with the optical fiber 8.

Figure 3:
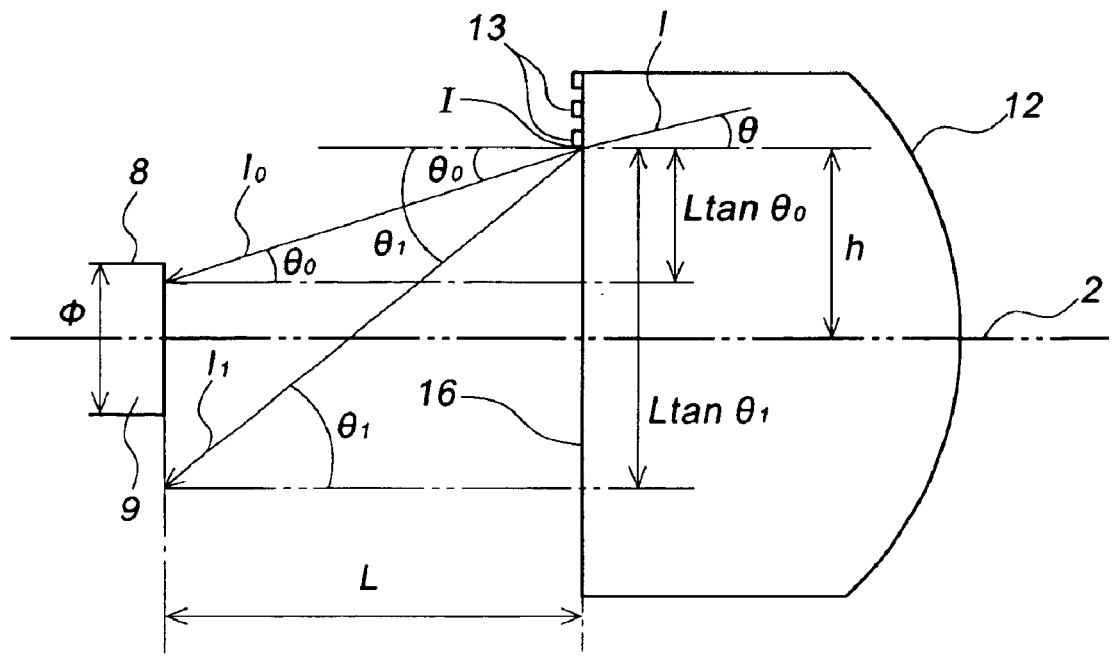
FIG. 3 is a reference diagram for deriving expression (1) indicative of conditions of the spacing of a diffraction grating in the preferred embodiment of an optical module according to the present invention.

Now, as shown in FIG. 3, on a plane passing through the optical axis 2, an optional light beam 1 incident at an optional point I on the diffraction surface 16 at an incident angle θ will be considered.

In FIG. 3, when the diffraction surface 16 is parallel to the end face of the optical fiber 8, assuming that the distance between the optical axis 2 and the point I is h, then, h can be the maximum value in a range, in which a zeroth-order diffracted light beam $1_0$ (diffraction angle: $\theta_0$) caused when the light beam 1 passes through the diffraction surface 16 is coupled with the optical fiber 8, if $\theta_0 = \theta_{NA}$.

Therefore, h is expressed by the following expression.

$$h \leq L \tan \theta_{NA} + \Phi/2 \quad (4)$$

That is, when the zeroth-order diffracted light beam has $\theta_{NA}$ and when the zeroth-order diffracted light beam is incident on the top end of the optical fiber 8 in FIG. 3, h is the maximum value. When h exceeds this value, the zeroth-order diffracted light beam does not reach the end face of the optical fiber 8. Alternatively, even if the zeroth-order diffracted light beam reaches the end face of the optical fiber 8, the incident angle on the end face of the optical fiber 8 exceeds $\theta_{NA}$, so that the diffracted light beam is not coupled with the optical fiber 8.

On the other hand, conditions that all of first-order diffracted light beams $1_1$ are not coupled with the end face of the optical fiber 8 are geometrically expressed by the following expression:

$$L \tan \theta_1 > h + \Phi/2 \quad (5)$$

wherein $\theta_1$ denotes the diffraction angle of the first-order diffracted light beam $1_1$.

From expression (5), if the diffraction angle of the first-order diffracted light beam satisfies conditions expressed by the following expression (6), the diffracted light beams of the first and higher orders are not coupled with the optical fiber 8.

$$\theta_1 > \tan^{-1}\{(h+\Phi/2)/L\} \quad (6)$$

As described above, in a range wherein the zeroth-order diffracted light beam is coupled with the optical fiber 8, h can be the maximum value when $\theta_{0=\theta NA}$.

Since the value of $\tan^{-1} x$ increases as x increases, the relationship obtained by substituting the maximum value of h (h=L tan $\theta_{NA}+\Phi/2$) for expression (6) is established with respect to all values of h in the range of $h \leq L \tan \theta_{NA} + \Phi/2$.

Therefore, as conditions that the zeroth-order diffracted light beam is coupled with the optical fiber 8 and that all of the diffracted light beams of the first and higher orders are not coupled with the optical fiber 8, the following conditions expressed by expression (7) are obtained.

$$\theta_1 > \tan^{-1}(\tan \theta_{NA} + \Phi/L) \quad (7)$$

Using the incident angle $\theta$ on the diffraction surface, the order m of a diffracted light beam, the diffraction angle $\theta_m$ of the mth-order diffracted light beam, the wavelength $\lambda$, the spacing P of the diffraction grating 13 and the refractive index n of a resin forming the holder, the diffracted light beam is expressed by the following expression.

$$\sin \theta_m - n \sin \theta = m(\lambda/P) \quad (8)$$

From expression (8), the following expression is established with respect to the zeroth-order diffracted light beam.

$$\sin \theta_0 - n \sin \theta = 0 \quad (9)$$

From expression (8), the following expression is established with respect to the first-order diffracted light beam.

$$\sin \theta_1 - n \sin \theta = \lambda/P \quad (10)$$

From expressions (9) and (10), the following expression is obtained.

$$P = \lambda/(\sin \theta_1 - \sin \theta_0) \quad (11)$$

Since $0 \leq \theta_1 \leq \pi/2$, $0 \leq \theta_0 \leq \pi/2$ and $\theta_0 \leq \theta_1$, the conditional expression (1) is derived by substituting expression (7), which is obtained by substituting the maximum value of h when $\theta_0 = \theta_{NA}$, for expression (11).

Thus, since it is possible to prevent the diffracted light beams of the first and higher orders from being coupled with the optical fiber 8, it is possible to more effectively prevent the occurrence of communication errors, so that it is possible to more appropriately carry out optical communication. In addition, since such an optical module 1 for appropriately carrying out optical communication can be uniformly designed under the conditions unified by expression (1), it is possible to more highly improve productivity.

Figure 4:
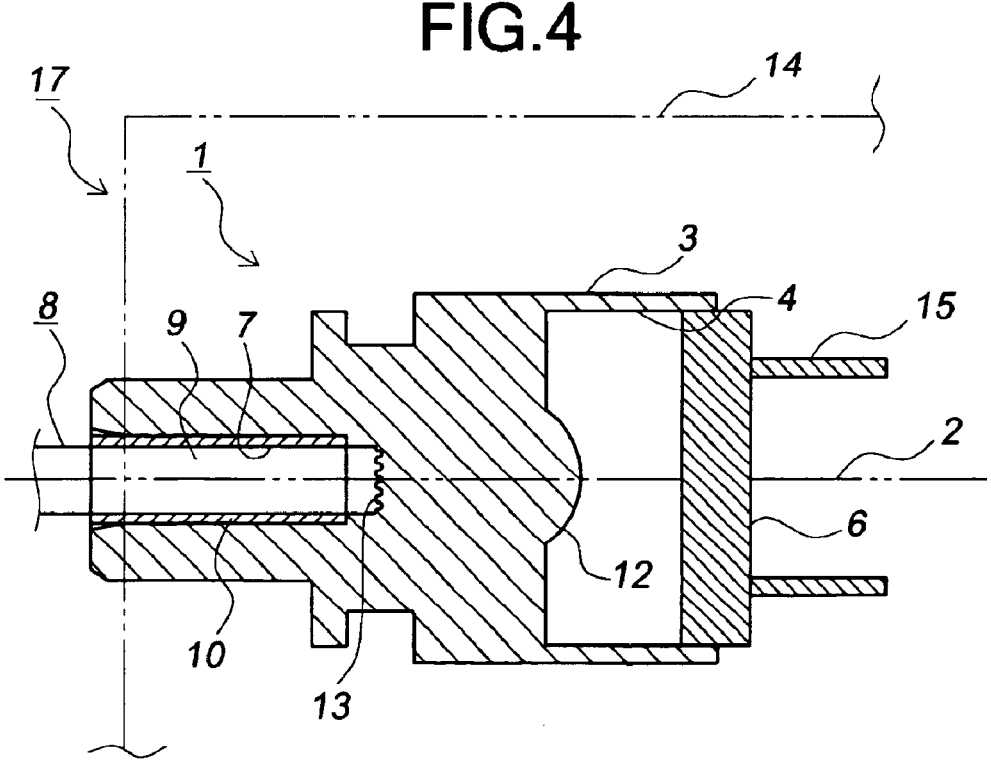
FIG. 4 is a schematic diagram of a preferred embodiment of an optical connector according to the present invention.

Furthermore, as shown in FIG. 4, the optical module 1 with the above described construction is housed in a housing 14 as an optical module for emission of light, and lead terminals 15 are connected to an electric substrate (not shown) in the housing 14 to form an optical connector 17.

Operations in this preferred embodiment will be described below.

In order to carry out optical communication using the optical module 1 in this preferred embodiment, when an electric signal is first inputted to the semiconductor light emitting element, the electric signal is converted into a light signal by the semiconductor light emitting element to be emitted toward the lens 12.

Then, light beams emitted from the semiconductor light emitting element are condensed by the lens 12 to be diffracted by the diffraction grating 13 serving as a light-quantity damping means, which is formed on the surface of the holder 3 facing the optical fiber 8 and being opposite to the lens 12, to be dispersed into diffracted light beams of a plurality of diffraction orders.

At this time, since the spacing P of the diffraction grating 13 satisfies expression (1), only the zeroth-order diffracted light beam is coupled with the optical fiber 8, and the diffracted light beams of the first and higher orders escape to the outside without being coupled with the optical fiber 8.

As a result, it is possible to damp the quantity of light coupled with the optical fiber 8.

Then, after the light beam coupled with the optical fiber 8 travels toward the semiconductor light receiving element while repeatedly carrying out total reflection in the optical fiber 8, the light beam is received by the semiconductor light receiving element to be converted into an electric signal.

Since the quantity of light coupled with the semiconductor light receiving element from the optical fiber 8 has been damped by the diffraction grating 13, excessively strong light is not incident on the semiconductor light receiving element.

Thus, it is possible to appropriately carry out optical communication without causing communication errors.

Furthermore, the present invention should not be limited to the above described preferred embodiment, and the invention can be modified in various ways if necessary.

For example, while the optical module 1 having the emission-side semiconductor light emitting element has been described as an example of an optical module in the above described preferred embodiment, the present invention should not be limited thereto, but the invention may be applied to a light-receiving-side optical module having a semiconductor light receiving element to control the quantity of light to be received.

The efficiency of diffraction may be controlled by the sectional shape of the diffraction grating 13 and/or the depth of grooves thereof. Also in this case, the quantity of light to be emitted or received can be controlled similar to a case where the spacing P is controlled. Furthermore, as the sectional shape of the diffraction grating 13, there are considered various shapes, such as a rectangular pulse shape, a saw tooth wave shape, a trapezoidal pulse shape, and a sinusoidal wave shape.

The diffraction grating serving as the light-quantity damping means may be formed on a surface of the holder facing the semiconductor light emitting element on the same side as that of the lens 12.

As described above, according to the present invention, it is possible to realize an inexpensive optical module suitable for mass production due to improved productivity, and an optical connector having the same. Moreover, according to the present invention, it is possible to provide an optical module capable of effectively preventing the occurrence of communication errors to appropriately carry out optical communication, and an optical connector having the same.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical module comprising:

a holder having a photoelectric transfer element package mounting hole for mounting therein a photoelectric transfer element package which houses therein a photoelectric transfer element, and an optical fiber mounting hole for mounting therein an optical fiber and a ferrule, said photoelectric transfer element package mounting hole being arranged on one side of said holder in axial directions thereof, and said optical fiber mounting hole being arranged on the other side of said holder in axial directions thereof;

a lens, arranged between said photoelectric transfer element package mounting hole and said optical fiber mounting hole in said holder, for causing said photoelectric transfer element to be optically coupled with said optical fiber; and light-quantity damping means for damping the quantity of light, which is emitted from said photoelectric transfer element, before the light enters said optical fiber, wherein said holder, said lens and said light-quantity damping means are formed of a resin material so as to be integrated with each other.

2. An optical module as set forth in claim 1, where in said light-quantity damping means comprises a diffraction grating for preventing a high-order diffracted light beam from being coupled with said optical fiber.

3. An optical module as set forth in claim 2, wherein said diffraction grating satisfies conditional expression (1) so as to cause only a zeroth-order diffracted beam to be coupled with said optical fiber:

$$P<\lambda/[\sin[\tan^{-1}\{\tan\theta_{NA}+\Phi/L\}]-\sin\theta_{NA}] \quad (1)$$

wherein P denotes a spacing of said diffraction grating, and λ denotes a wavelength to be used, Φ denoting a diameter of said optical fiber, L denoting a distance between an end face of said optical fiber and said diffraction grating, and $\theta_{NA}$ denoting an angle (NA=sin $\theta_{NA}$) for giving a numerical aperture (NA) of said optical fiber.

4. An optical connector comprising:

an optical module as set forth in claim 1; and a housing for receiving and holding therein said optical module.

5. An optical connector as set forth in claim 4, wherein said light-quantity damping means comprises a diffraction grating for preventing a high-order diffracted light beam from being coupled with said optical fiber.

6. An optical connector as set forth in claim 5, wherein said diffraction grating satisfies conditional expression (1) so as to cause only a zeroth-order diffracted beam to be coupled with said optical fiber:

$$P<\lambda/[\sin[\tan^{-1}\{\tan\theta_{NA}+\Phi/L\}]-\sin\theta_{NA}] \quad (1)$$

wherein P denotes a spacing of said diffraction grating, and λ denotes a wavelength to be used, Φ denoting a diameter of said optical fiber, L denoting a distance between an end face of said optical fiber and said diffraction grating, and $\theta_{NA}$ denoting an angle (NA=sin $\theta_{NA}$) for giving a numerical aperture (NA) of said optical fiber.

* * * * *